(12) United States Patent
Strein et al.

(10) Patent No.: US 9,414,011 B2
(45) Date of Patent: Aug. 9, 2016

(54) REMOTE, DIRECTED DELIVERY OF DATA FOR ON-AIR GRAPHICS

(71) Applicant: Disney Enterprises, Inc., Burbank, CA (US)

(72) Inventors: Michael J. Strein, Bohemia, NY (US); Jorge Veloso, Bridgton, ME (US); Terrence Pong, New York, NY (US); Jonas Geduldig, Glen Rock, NJ (US)

(73) Assignee: Disney Enterprises, Inc., Burbank, CA (US)

( * ) Notice: Subject to any disclaimer, the term of this patent is extended or adjusted under 35 U.S.C. 154(b) by 29 days.

(21) Appl. No.: 14/271,565

(22) Filed: May 7, 2014

(65) Prior Publication Data

US 2015/0326819 A1 Nov. 12, 2015

(51) Int. Cl.
*H04N 7/00* (2011.01)
*H04N 5/262* (2006.01)
*H04N 21/4402* (2011.01)
*H04N 21/44* (2011.01)

(52) U.S. Cl.
CPC ............ *H04N 7/007* (2013.01); *H04N 5/262* (2013.01); *H04N 21/44* (2013.01); *H04N 21/4402* (2013.01); *H04N 21/44008* (2013.01); *H04N 21/44016* (2013.01); *H04N 21/44029* (2013.01); *H04N 21/440245* (2013.01)

(58) Field of Classification Search
None
See application file for complete search history.

(56) References Cited

U.S. PATENT DOCUMENTS

| | | | |
|---|---|---|---|
| 2004/0161225 A1 | 8/2004 | Dawson | |
| 2006/0015904 A1* | 1/2006 | Marcus | 725/46 |
| 2011/0321084 A1* | 12/2011 | Takahashi et al. | 725/32 |
| 2014/0006951 A1* | 1/2014 | Hunter | H04H 60/31 715/719 |
| 2014/0259051 A1 | 9/2014 | Strein et al. | |
| 2014/0304756 A1 | 10/2014 | Fletcher | |

OTHER PUBLICATIONS

U.S. Patent Application entitled Carrying Graphical Data Embedded in a Program Stream, U.S. Appl. No. 14/271,549, filed May 7, 2014.
Xstudio User Manual v.4.7, published by Miranda Technologies Inc. Aug. 29, 2011, 440 pages.

* cited by examiner

*Primary Examiner* — Justin Shepard
(74) *Attorney, Agent, or Firm* — Patterson + Sheridan, LLP

(57) ABSTRACT

Systems, methods, and computer program products to perform an operation, the operation comprising defining, in a message, attributes of a graphics object to overlay on a video as part of a media broadcast, wherein the attributes comprise an identifier of a template for the graphics object and a time in the video to overlay the graphics object, and publishing the message to one or more recipients.

20 Claims, 10 Drawing Sheets

VIDEO SOURCE   100

VIDEO 101
DATA SPACE OF VIDEO:
OPTIONAL DATA

GRAPHICS:
PRODUCTION

---

TRIGGER INSERT   120

VIDEO 101 WITH TRIGGERS
DATA SPACE OF VIDEO:
T1: {HTTP://URL.COM/TEMPLATE 1,
   HTTP://URL.COM/UPDATE 1, 8 MINS 11 S}
T2: {C:\TEMPLATES\TEMPLATE 2,
   HTTP://URL.COM/UPDATE 2, 17 MINS 1 S}

GRAPHICS:
PRODUCTION

---

GRAPHICS INSERTER 140$_{1-N}$
(ANY PLAYBACK)

VIDEO 101 WITH GRAPHICS OVERLAID
DATA SPACE OF VIDEO:
MAY RETAIN INSERTED TRIGGERS
(OPTIONAL)

GRAPHICS:
PRODUCTION AND TRIGGER-
DEFINED (T1, T2)

200

→ OPTIONALLY SAVE AS CLEAN RECORD 131 WITH TRIGGERS

*FIG. 2*

REMOTE, DIRECTED DELIVERY OF DATA FOR ON-AIR GRAPHICS

BACKGROUND

1. Field of the Disclosure

Embodiments disclosed herein relate to the field of media broadcasting. More specifically, embodiments disclosed herein relate to remote, directed delivery of data for on-air graphics.

2. Description of the Related Art

Entry of on-air graphics data for media broadcast is typically directly entered manually by an operator, or entered automatically via a database, spreadsheet, or other local file.

SUMMARY

Embodiments disclosed herein include at least a system, method, and computer program product to perform an operation, the operation comprising defining, in a message, attributes of a graphics object to overlay on a video as part of a media broadcast, wherein the attributes comprise an identifier of a template for the graphics object and a time in the video to overlay the graphics object, and publishing the message to one or more recipients.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

FIG. 2 is a data flow diagram to carry graphical data in a video, according to one embodiment.

DETAILED DESCRIPTION

Figure 1A:
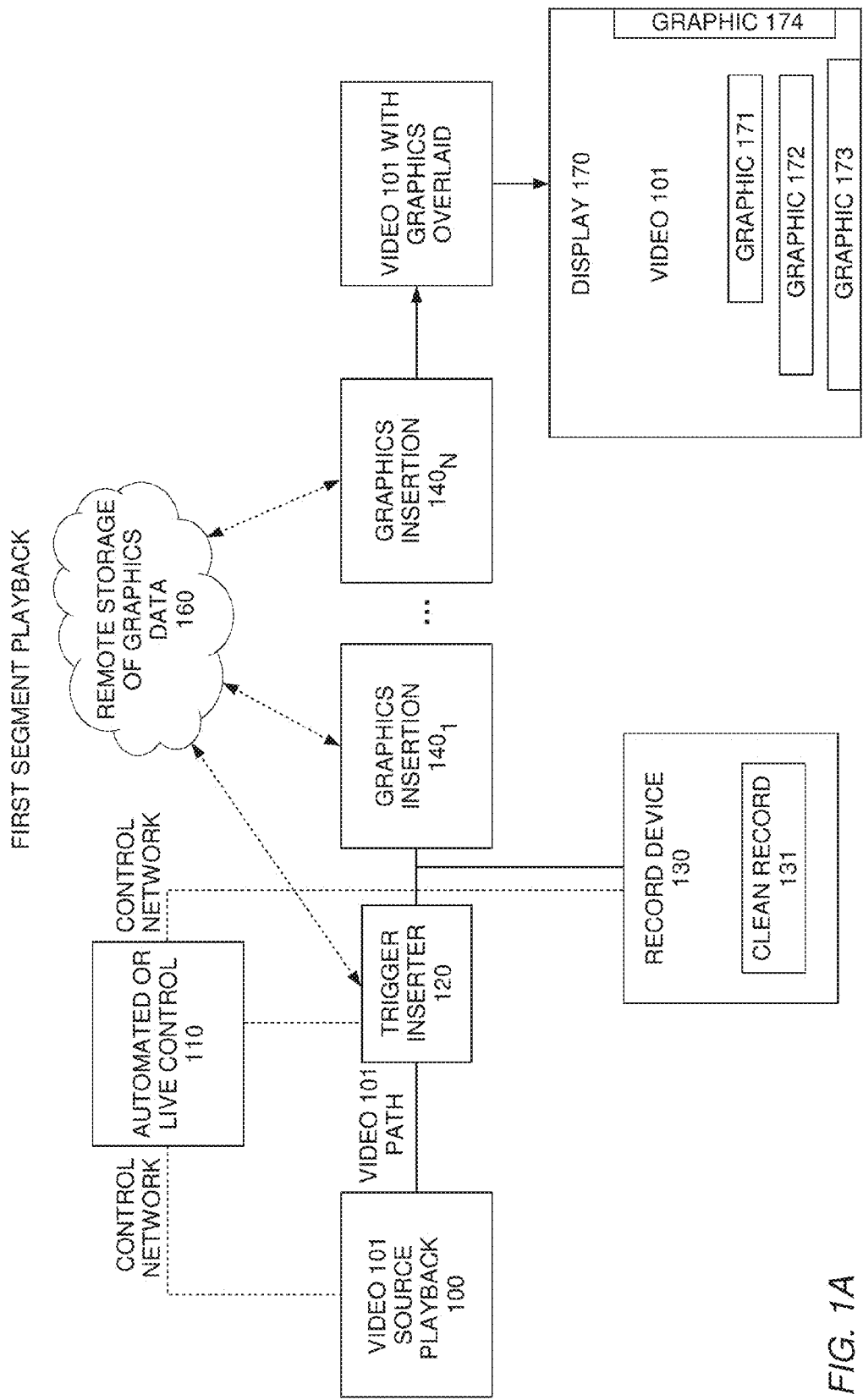
FIGS. 1A-1B illustrate techniques to carry graphical data embedded in a program stream, according to one embodiment.

Embodiments disclosed herein leverage a variety of delivery mechanisms, such as the Internet, social media, direct data connections (such as VPNs), and cellular networks to provide directed, specific graphics data to affiliated TV stations, station hubs, cable head ends, or other such entities requiring graphically displayed content that incorporates the graphics data. Timely, topical data may therefore be scheduled and delivered in ways not previously possible, and may be used for applications such as promoting television content, especially late breaking or changing content. Generally, in embodiments disclosed herein, a central computer may include a daily schedule of promotions categorized by region. The central computer may compose and transmit messages corresponding to these promotions. A computer at a recipient may monitor the messages that target their specific region, and extract the promotional content. The computer may then create the graphical content and insert the graphical content into a video.

For example, the computer may publish a message directed at a New York affiliate of a national television broadcaster. The message may specify to air a promotion for the late-night news during an 8 PM sitcom. The message may also specify a location (such as a uniform resource locator (URL)) of a graphics template that should be used to create a graphics object for the promotion. In addition, the message may further specify metadata attributes of the nightly news, such as what time the news airs, on which station the news airs, and the name of a star news anchor featured during the broadcast. While multiple affiliates may receive the message, only the New York affiliate will match the targeted region identifier. When the New York affiliate receives the message, a graphics insertion device may retrieve the graphics template, and use the metadata to complete the graphics object. The graphics insertion device may then insert the graphic on the video for the 8 PM sitcom, at a time specified in the message (such as 8:08 PM).

Additionally, embodiments disclosed herein store information related to graphics content as data in a video such that entities broadcasting the video can create the graphics content, including current data values for variables in the graphics content, and refresh the video to include the most current graphics. More specifically, embodiments disclosed herein may define a set of attributes for each graphics item of the graphics content, and store the attributes in the data space of the video. The attributes for a given graphics item may be referred to herein as a "trigger." The set of attributes for the trigger may include, without limitation, a pointer to a location of the graphics object, a pointer to a location of a current value for a variable of the graphics object, and a time in the video to overlay the graphics object. When an entity (such as a local broadcaster) later attempts to produce the video to include updated graphics for a subsequent broadcast, the entity may identify the triggers, and reference the pointers in order to recreate the graphics object to include the most current information.

For example, graphical content such as news crawls, stock tickers, date and/or time, temperature, sports scores, social media messages, overlaid text, and the like may be added to video footage during production of a video program (e.g., a news program, sitcom, sporting event, or movie). Therefore, if a sitcom is produced for an 8:00 PM Monday broadcast, the graphical content includes the values for the graphical content for the initial 8:00 PM Monday broadcast. Many programs, however, are aired multiple times, such as on the same day in different time zones, or on different dates altogether. As such, some of the graphical data may be outdated when the programs are re-broadcast. For example, a breaking news event that is ongoing during the 8:00 PM Monday broadcast of a sitcom in New York may be resolved by the time the sitcom is re-broadcast at 8:00 PM in California, three hours later. Therefore, the information displayed about the news event should be refreshed to reflect the final (or most current) status of the news event before broadcasting the sitcom in California. By storing pointers (such as a URL) in the data space of the video to a location where updated information about the news event can be obtained, an entity producing the sitcom for the California broadcast may programmatically retrieve the most current information regarding the news event, and refresh the graphics to include the retrieved information.

FIG. 1A is a block diagram illustrating techniques to carry graphical data embedded in a program stream, according to one embodiment. Generally, FIG. 1A shows a first segment playback, which refers to embedding graphics triggers in the data space of a video, using the triggers to overlay the graphics on the video, and broadcasting the video. As shown, a network control box 110 is a system that provides automated or live control of the original source playback 100, the trigger inserter 120, and a record device 130. The video source 100 plays the video 101, which may be the original output of a production control room where a video program is assembled.

The trigger inserter 120 is configured to receive the video 101 and place data (also referred to as "triggers") in the vertical ancillary data space (VANC) of the video 101. The insertion point of these triggers may be specified by an automation system of the network control box 110 (in the case of automated, planned events), or by an operator (in the case of live events, which may require previously defined practices on where these trigger events are typically placed). Regardless of how the triggers are inserted, they are planned scheduled events in the broadcast stream. The data may be a trigger specifying the exact insertion point in time for a specific visual graphic, as well as relevant metadata attributes pertaining to that specific graphic. The attributes may include specific templates for the graphic insertion devices $140_{1-N}$ to load, as well as uniform resource locator (URL) information should any portion of that graphic, visual or data, be located remotely (such as in the remote store 160). In at least one embodiment, the trigger data is formatted using proprietary Data ID (DID) and Secondary Data ID (SDID) identifiers according to processes standardized by the Society of Motion Picture and Television Engineers (SMPTE). These triggers may also use protocols standardized by the Society of Cable Television Engineers (SCTE), customized protocols, or a combination thereof. The record device 130 may be a device that records video for future use, such as the video 101 prior to the non-program related graphics insertion by graphics insertion devices $140_{1-N}$. However, according to embodiments disclosed herein, the video 131 recorded by the record device 130 includes the triggers inserted by the trigger inserter 120.

The graphics insertion devices $140_{1-N}$ are configured to insert non-program related content, including, but not limited to, news crawls, sports scores, stock prices, time, temperature, and the like. The graphics insertion devices $140_{1-N}$ may be standalone systems, or software modules in one or more physical systems, and need not be under control of the control network 110. The graphics insertion devices $140_{1-N}$ may store a plurality of local graphics templates (not pictured). The graphics insertion devices $140_{1-N}$ may further access remote templates and current data values from the remote store 160. The remote store 160 includes graphics templates, data values, and other variables. For example, the remote store 160 may include current stock data, current sports scores, weather information, time, temperature, and the like. Generally, any type of information may be stored in the remote store 160.

When the graphics insertion devices $140_{1-N}$ receive the video 101, the graphics insertion devices $140_{1-N}$ may identify the triggers inserted in the VANC of the video by the trigger inserter 120. In response, the graphics insertion devices $140_{1-N}$ read the trigger attributes in order to create each graphic, and insert (or overlay) each graphic on the video 101. For example, a first trigger may specify a first URL for a sports score graphic, a second URL for the actual (or current) score of a sporting event, and a time in the video to display the sports score graphic. The graphics insertion devices $140_{1-N}$ may then retrieve the sports score graphic (i.e., a graphics template) from the first URL, the actual score from the second URL, and create the sports score graphic including the current sports score. The graphics insertion devices $140_{1-N}$ may then overlay or insert the sports score graphic at the time in the video specified in the trigger. Once each of the one or more graphics insertion devices $140_{1-N}$ inserts the graphics specified in each trigger, the video 101 with graphics overlaid may be broadcast via any medium. For example, and without limitation, the medium may be via satellite, over-the-air networks, cable networks, the Internet, and the like. A display device 170 may then display the video 101 including exemplary graphics 171-174 for viewing. The display device 170 may be any device configured to display video, such as a television, computer, tablet, smart phone, or any computing device.

Figure 1B:
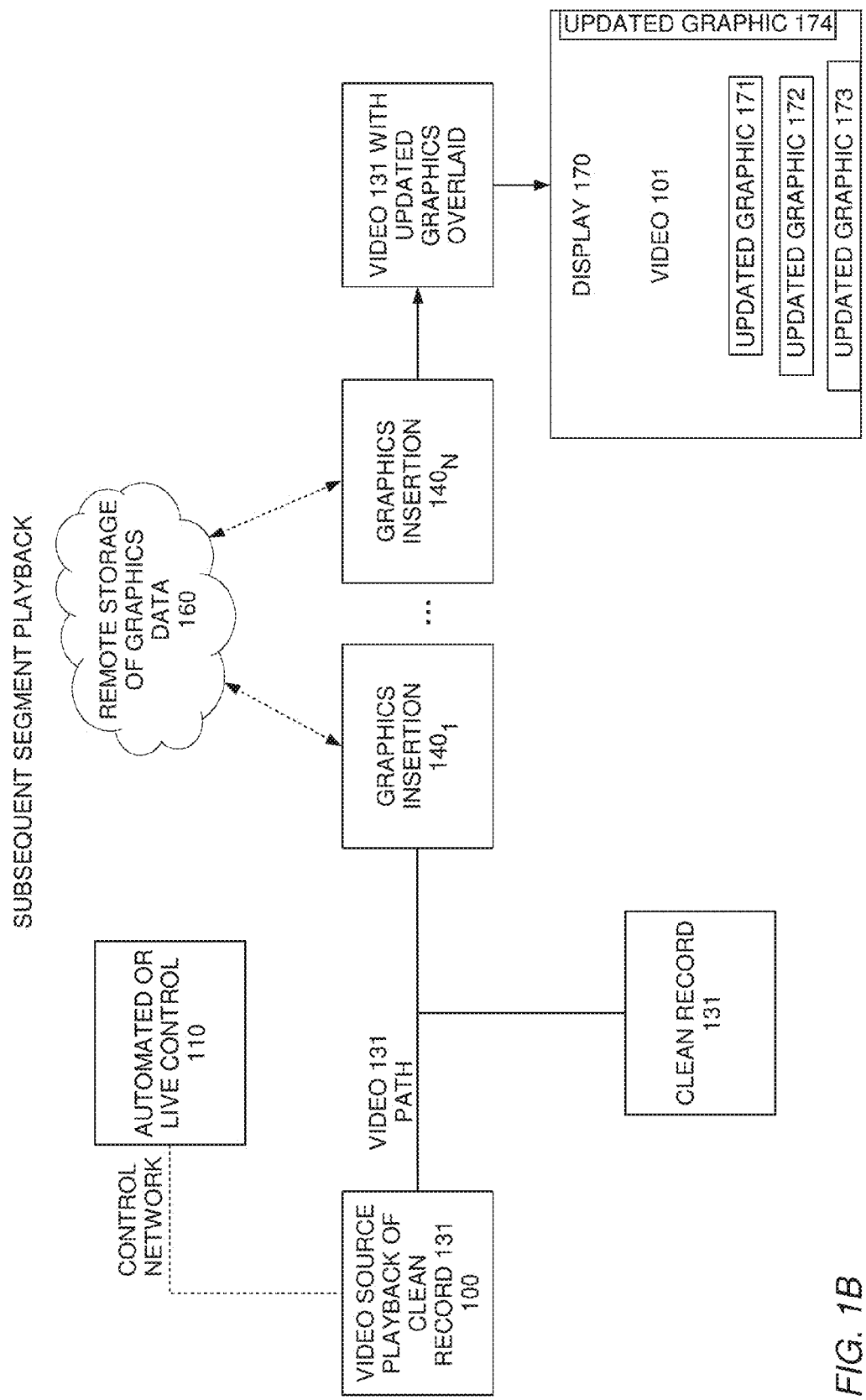

FIG. 1B is a block diagram illustrating techniques to carry graphical data embedded in a program stream, according to one embodiment. Generally, FIG. 1B depicts the subsequent playback of the video 131 recorded by the record device 130, which includes graphics triggers inserted by the trigger inserter 120. Because the graphics triggers (including the relevant metadata attributes of each trigger) are in the video 131, no control network is required for the graphics insertion devices $140_{1-N}$. Instead, the trigger metadata either contains all of the information necessary to create each graphic, or includes references to where that information is located. All topical information for these visual graphics can be entered or changed completely separately. Although a copy of the clean record 131 is shown, it may not be necessary if there are no changes to the program elements played back from the video source.

As shown in FIG. 1B, therefore, the network control box 110 controls the video source 100 playback of the video 131, which includes the graphics triggers. The video 131 is then sent to one or more graphics insertion devices $140_{1-N}$, which may create the graphics specified in each trigger, and insert the graphics onto the video 131. As in FIG. 1A, the graphics templates and values for the variables of a graphics object (such as the current temperature, time, date, stock information, news information, and the like) may be stored locally in the graphics insertion devices $140_{1-N}$, or remotely in the remote store 160. Once the graphics insertion devices $140_{1-N}$ create and overlay each graphic having a trigger in the video 131, the video 131 is broadcast to one or more viewers. As shown, the display 170 now displays the video 131 with updated graphics 171-174. For example, in FIG. 1A, graphic 171 may be the current temperature in New York, N.Y. at the time the video 101 was broadcasted and output on the display 170. Assuming the broadcast of the video 131 in FIG. 1B is a late-night re-run of the video 101, the updated graphic 171 may include the late-night temperature in New York, N.Y., which accurately reflects the current temperature in New York at the time of the broadcast in FIG. 1B.

FIG. 2 is a data flow diagram 200 to carry graphical data in a video, according to one embodiment. Generally, the steps of the data flow diagram 200 depict the manipulation of a video in order to insert triggers data triggers in the video, and use the triggers to insert updated graphics in the video. As shown, the video 101 may be provided by the video source 100. As shown, the video 101 may include graphics that are overlaid on the video as part of the initial production process. Additionally, optional data may be inserted in the data space of the video. The video 101 is then processed by the trigger inserter 120, which creates the video 101 with triggers. As shown, the data space (VANC) of the video 101 now includes two example triggers, T1 and T2, each corresponding to a graphics object. As shown, the triggers T1, T2 include a URL to a template for the graphics object, as well as a URL to a source where updated data values for the graphics object may be found. The triggers T1, T2 also include a time in the video to insert the graphics object. The URLs, as shown, may be local or remote. As shown, the video 101 also include any production-related graphics.

Once the trigger inserter 120 processes the video 101, a copy of the video 101 with triggers may be saved as the clean record 131 with triggers. Thereafter, graphics inserters 140$_{1-N}$ may receive the video. The graphics inserters 140$_{1-N}$ may be part of any segment playback, such as the first segment playback of FIG. 1A, or the subsequent segment playbacks of FIG. 1B. Once the graphics inserters 140$_{1-N}$ identify the triggers T1, T2, the graphics inserters 140$_{1-N}$ may reference the URLs to retrieve the graphics template and current data values for the graphics objects of each trigger. The graphics inserters 140$_{1-N}$ may then create the graphics objects, and overlay the graphics objects at the time in the video 101 specified in each trigger. Therefore, the graphics inserters 140$_{1-N}$ may insert a first graphics object at 8 minutes, 11 seconds into the video, using a template at http://url.com/template1, and data values for the template located at http://url.com/update1, as defined by trigger T1. Likewise, for trigger T2, the graphics inserters 140$_{1-N}$ may insert a second graphics object at 17 minutes, 1 second in the video 101, using a template at c:\templates\template2, and data values for the template located at http://url.com/update2. The video 101 with graphics overlaid may or may not include the trigger data of triggers T1, T2. These triggers may remain as part of the video stream, as the stream may be subsequently or repeatedly played again, requiring the use of these triggers. Optionally, the triggers may be removed if no longer needed. Once the graphics inserters 140$_{1-N}$ process the video 101, a graphics object corresponding to each trigger in the VANC of the video 101 will be overlaid on the video 101 with graphics overlaid.

Figure 3:
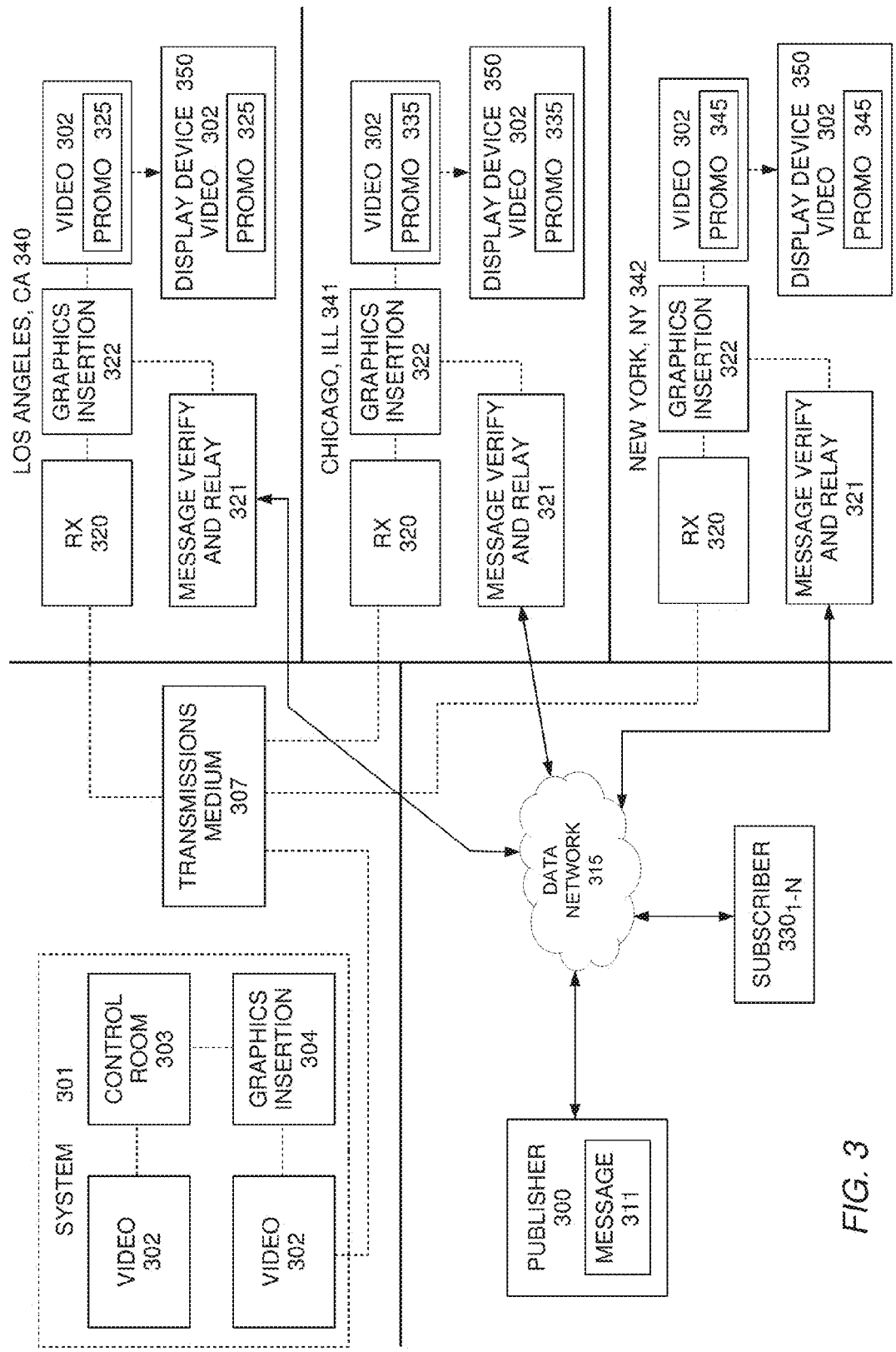
FIG. 3 illustrates techniques to provide remote, directed delivery of data for on-air graphics, according to one embodiment.

FIG. 3 is a block diagram illustrating techniques to provide remote, directed delivery of data for on-air graphics, according to one embodiment. Generally, FIG. 3 depicts techniques to remotely distribute unique promotional graphics content and data, which may then be combined with video content at an end location. It should be noted that FIG. 3 uses television stations as a reference example only, and embodiments of the disclosure are not limited to the television station setting. Generally, any setting where remote distribution of promotional graphics content and/or data may be implemented is contemplated by embodiments of the disclosure. For example, the techniques described in FIG. 3 may be used to deliver the promotional graphics content and/or data to video kiosks, digital signage stations, and billboards at diverse geographical locations.

As shown, a production system 301 describes the path of a video 302 from program origination to transmission of the video 302 to different local affiliates 340-342 in Los Angeles, Chicago, and New York. Although three affiliates are shown, any number of entities may be configured to receive the video 302. Generally, the video 302 flows through the control room 303, where graphics related to the program are inserted. A graphics insertion device 304 may create promotional (or other) graphics and insert the graphics onto the video 302. For example, the graphics insertion device 304 may insert promotional graphics for other television programs, or non-program related graphics, such as the sports scores, stock data, and the like, described in FIGS. 1A-1B. Once the graphics insertion device 304 inserts the graphics in the video 302, the video 302 is transmitted to receiving devices 320 at each local affiliate 340-342 through a transmissions medium 307. The transmission medium 307 may be any suitable medium, including without limitation, a satellite transponder or the Internet.

As shown, a publishing system 300 is a source computer which publishes graphics and/or related data to the local affiliates 340-342 and/or one or more subscribers 330$_{1-N}$. The publishing system 300 may have a daily schedule (not shown) of promotions categorized by region. Based on the schedule, the publishing system 300 may compose one or more messages 311 which include information about graphics or related data to overlay on the video 302. In addition, the messages 311 may be manually created by a user and transmitted by the publishing system 300. Messages 311 sent by the publishing system may be of any form, and are sent through the data network 315. For example, and without limitation, the messages 311 may be emails, social media messages, SMS or text messages, direct messages, or web pages. In at least one embodiment, the data network 315 is the Internet. In at least some embodiments, the messages 311 include a region identifier, such that the local affiliates 340-342 must verify that their region identifier matches the region identifier in the message 311 prior to inserting the specified promotion in the video 302.

The message 311 may specify any number of attributes. In one embodiment, the message 311 specifies a graphics template identifier, an event name, an event location, an event time, and an event message. The graphics template identifier may be a reference to a graphics object, such as a URL to a graphics template. The event name may be a name of the event being promoted through the message 311, such as a television show, sporting event, and the like. The event location may indicate where the viewer may access the promoted event, while the event time indicates a time in the video 302 to insert (or overlay) the promotional graphic. Finally, the event message may be a message to one or more viewers of the local affiliates 340-342, or the subscribers 330$_{1-N}$. For example, a first message 311 may specify a URL for a promotional graphics template for the national news. The first message 311 may specify the name of the national news program, a channel on which it may be viewed, a message to the viewer (such as "Don't Miss the National News!"), and may further direct the local affiliates 340-341 to air the promotion at 10:08 PM local time.

The subscribers 330$_{1-N}$ may be user computing devices configured to receive the messages 311 through the data network 315. For example, the subscribers 330$_{1-N}$ may be "followers" of the publisher 300 on a social media service, and receive the message 311 through the data network 315. Generally, the subscribers 330$_{1-N}$ may receive the message through any social media platform, email, SMS or text message, and the like. By sending the message 311 to the subscribers 330$_{1-N}$, embodiments disclosed herein provide advertisements or promotions simultaneously through the video 302 and the message 311 (via social media, email, and the like).

The computers 321 at each affiliate 340-342 are configured to receive the message 311, and verify that the message is intended for their region, by matching the region identifier. For example, a first message may be intended for the west coast of the United States. Therefore, the region identifier for the first message may only match the region identifier of local affiliate 340, which is in Los Angeles. If the region identifier in the message 311 does not match the local region identifier, the computer 321 may discard the message 311. Once the target region is verified, the computer 321 may relay the message 311 to the graphics insertion devices 322, which may generate the graphic and insert the graphic at the time in the video 302 specified in the message 311. In at least some embodiments, the computer 321 may include the graphics insertion devices 322, such that a single computing device may receive the message 311, generate the graphic, and overlay the graphic on the video 302.

Therefore, as shown, a promotion 325 has been overlaid on the video 302 in Los Angeles. The video 302 including the promotion 325 may then be displayed on the display device 350. The graphics insertion device 322 in Los Angeles may have inserted the promotion 325 responsive to a first message 311 sent by the publishing system 300, destined for the Los Angeles market. Similarly, a promotion 335 has been overlaid on the video 302 in Chicago. The video 302 including the promotion 335 may then be displayed on the display device 350. Again, the graphics insertion device 322 in Chicago may have inserted the promotion 335 responsive to a second message 311 sent by the publishing system 300, destined for the Chicago market. Finally, as shown, a promotion 345 has been overlaid on the video 302 in New York. The video 302 including the promotion 345 may then be displayed on the display device 350. Again, the graphics insertion device 322 in New York may have inserted the promotion 335 responsive to a third message 311 sent by the publishing system 300, this time targeted for the New York market. The display device 350 may be any device configured to display video, such as a television, computer, tablet, smart phone, or any computing device.

Figure 4:
FIG. 4 illustrates a video including graphical content, according to one embodiment.

FIG. 4 illustrates a video 400 including graphical content, according to one embodiment. Generally, the video 400 includes two graphics items, namely the news crawl 401 and a promotion 402, which may be overlaid on the video according to the techniques described in FIGS. 1A-1B and 2-3, respectively. Therefore, in some embodiments, the video 400 corresponds to one or more of the video 101 with inserted triggers, the video 131, and/or video 302 of FIGS. 1A-1B and 3.

In order to generate the news crawl 401, a graphics insertion device identifies a trigger (not pictured) in the data space of the video 400. The trigger may specify a location of a graphics template for the news crawl 401, a location of a source providing the news of the news crawl 401, and a time to overlay the news crawl 401 in the video 400. Upon identifying the trigger, the graphics insertion device may reference the locations of the graphics template and the news source, and create the news crawl 401 graphic including depicted news data, which, in this example, is weather-related. The graphics insertion device may then overlay the news crawl 401 over the video 400 at the time specified in the trigger.

In order to generate the promotion 402, a graphics insertion device may receive a message, such as the message 311. The message 311 may specify a location of a graphics template for the promotion 402, metadata (or a pointer thereto) about the event being promoted, and a time in the video 400 to overlay the promotion 402. In some embodiments, the message 311 may be targeted to a specific region. In such embodiments, the graphics insertion device may verify that its own region identifier matches a region identifier in the message 311 prior to creating and overlaying the promotion 402 on the video 400. The graphics insertion device may then retrieve the graphics template for the promotion 402 from the location specified in the message 311, and modify the template to include the metadata regarding the event being promoted. The graphics insertion device may optionally retrieve the metadata if a reference to the metadata is in the message 311, rather than expressly defined in the message 311. Once the graphics insertion device creates the promotion 402, the graphics insertion device may then insert the promotion 402 on the video 400. As shown, the video 400 now includes the promotion 402, which specifies a program being promoted, as well as times the program can be viewed, and where the program can be viewed.

The particular format and content of the graphics 401-402 for illustrative purposes only, and should not be considered limiting of the disclosure. Generally, the graphics 401-402 may be of any form suitable to convey information to viewers. Furthermore, the content of the graphics 401-402 may be of any type. For example, the graphics 401-402 may be product advertisements, promotions for other programming, or the aforementioned news crawls, sports tickers, stock tickers, weather information, and the like. The graphics may be still and/or animated, and may span one or more segments or frames of video. For example, the news crawl 401 may continue to display additional news information as the video 400 continues to play. Furthermore, in some embodiments, the graphics templates may be complete graphics objects ready for insertion, as they include all necessary data. In such embodiments, the trigger and/or the message may only specify a location for the graphics object.

Figure 5:
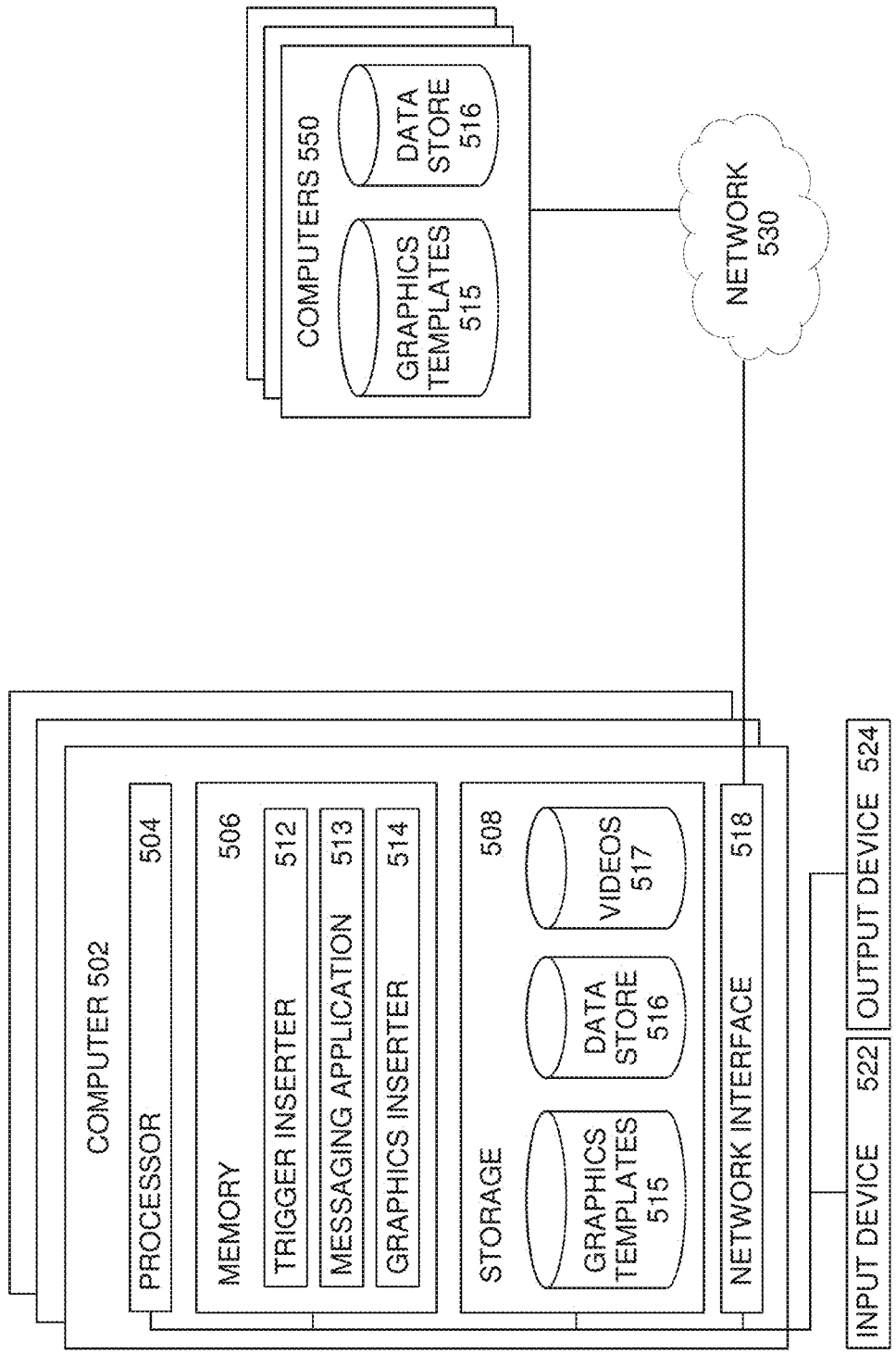
FIG. 5 is a block diagram illustrating a system to carry graphical data embedded in a program stream, according to one embodiment.

FIG. 5 is a block diagram illustrating a system 500 to carry graphical data embedded in a program stream, according to one embodiment. The networked system 500 includes one or more computers 502 connected via a network 530. The computers 502 may also be connected to other computers 550 via the network 530. In general, the network 530 may be a telecommunications network and/or a wide area network (WAN). In a particular embodiment, the network 530 is the Internet.

The computer 502 generally includes a processor 504 connected via a bus 520 to a memory 506, a network interface device 518, a storage 508, an input device 522, and an output device 524. The computer 502 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 504 is included to be representative of a single CPU, multiple CPUs, a single CPU having multiple processing cores, and the like. The network interface device 518 may be any type of network communications device allowing the computer 502 to communicate with other computers via the network 530.

The storage 508 may be a persistent storage device. Although the storage 508 is shown as a single unit, the storage 508 may be a combination of fixed and/or removable storage devices, such as fixed disc drives, solid state drives, SAN storage, NAS storage, removable memory cards or optical storage. The memory 506 and the storage 508 may be part of one virtual address space spanning multiple primary and secondary storage devices.

The input device 522 may be any device for providing input to the computer 502. For example, a keyboard and/or a mouse may be used. The output device 524 may be any device for providing output to a user of the computer 502. For example, the output device 524 may be any conventional display screen or set of speakers. Although shown separately from the input device 522, the output device 524 and input device 522 may be combined. For example, a display screen with an integrated touch-screen may be used.

As shown, the memory 506 contains the trigger inserter 512, which is an application generally configured to insert data "triggers" in the data space of a video, such as the videos stored in the video 517. The triggers inserted by the trigger inserter 512 may include attributes of a graphics object that a graphics insertion device, or the graphics inserter application 514, may create and overlay on a video. In at least some embodiments, the trigger attributes include, without limitation, a reference to the location of a graphics template 515 for the graphic, a reference to a data value in the data stores 516 for a variable of the graphic, and a time in the video to insert the graphic. Examples of graphics for which the trigger inserter 512 may insert triggers in a video include, without limitation, news crawls, stock tickers, weather information, time and/or date, sports scores, and the like. By inserting triggers in a video, the trigger inserter 512 allows for the data displayed in such graphics to be refreshed without having to manually recreate the graphics object, as discussed in greater detail with reference to FIGS. 1A-1B and 4. For example, the trigger inserter 512 may insert a trigger in a video corresponding to a graphics template 515 for the local weather. The trigger may specify locations (such as a URL) for the graphics template and a source of weather data, such as the data stores 516. The URLs may point to local or remote storage locations. Therefore, whenever the graphics inserter 514 processes a video including triggers, the graphics inserter 514 may identify the triggers, retrieve the graphics template and the current weather information from the specified locations, create an updated graphic that includes current weather information, and overlay the updated graphic on the video prior to publication.

As shown, the memory 506 also includes the messaging application 513, which is an application generally configured to compose and broadcast messages, as discussed in greater detail with reference to FIGS. 3-4. In at least some embodiments, the messaging application 513 creates and sends promotional messages, however, the messaging application 513 may convey any type of information that may be displayed on a video. When a message composed by the messaging application 513 (or a user) is received by an instance of the graphics inserter 514 (a remote or local instance), the graphics inserter 514 may create a promotional graphic according to the attributes specified in the message. In some embodiments, a remote instance of the messaging application 513 may receive the message and pass the message on to the graphics inserter 514. The messages composed by the messaging application 513 may include, without limitation, an identifier (such as a URL) of a graphics template in the graphics templates 515, and metadata about the promotion. In some embodiments a pointer to the metadata may be included in the message. In still some other embodiments, a recipient identifier may be included in the message, such that only intended recipients receive the promotion specified in the message. The recipient identifier may be any type of identifier, and correspond to any criteria, such as a geographical region, commercial or residential status, and the like. If the recipient identifier in the message matches a recipient identifier for a local entity receiving the message, the message may cause the graphics inserter 514 to create the graphic and insert the graphic in a video according to the message specifications. The messaging application 513 may compose messages according to any format, and may transmit the messages through any type of medium. In some embodiments, the messages comprise, without limitation, social media messages, emails, text messages, SMS messages, MMS messages, and direct messages.

For example, the messaging application 513 may compose a message directing recipients in the Central Time Zone to air a promotion for the local news at 8:15 pm local time. The message may include a location of a graphics template for the news promotion in the graphics templates 515, and specify metadata (or pointers to the metadata in the data store 516) related to the local news, such as times, dates, and a lead anchor starring in the news broadcast. Generally the metadata may include any attributes. When recipients (typically broadcasting entities) in the Central Time Zone receive the message, an instance of the graphics application 514 (or the messaging application 513) receiving the message may verify that their location has been directed to create the promotional graphic for the local news. As such, the graphics inserter 514 may retrieve the specified graphics template from the graphics template 515, and create the promotional graphic using the specified metadata attributes. The graphics inserter 514 may then overlay the graphic on the video being broadcast at 8:15 local time.

As shown, the storage 508 includes a graphics templates 515, a data store 516, and a videos 517. The graphics templates 515 include templates for a plurality of different graphics objects. The graphics objects may be any type of graphics object, such as a news crawl, sports score ticker, stock ticker, weather graphic, time and/or date graphic, or generic templates used to display any information. The data store 516 may include any type of data used to populate variables for the graphics 516, and may further include metadata attributes of different programs or events being promoted by the messaging application 513. For example, the data store 516 may include current weather data, stock data, sports scores, and the like. Furthermore, the data store 516 may include details about specific shows, programs, and events, such as air dates/ times, hosts, stars, guests, and the like. The videos 517 may include clean feeds of videos. The trigger inserter 512 (whether a local or remote instance) may have inserted triggers in at least some of the videos 517. Furthermore, although depicted as a local data store, the videos 517 may be received from a video production source, such as the video source 100 of FIGS. 1A-1B.

As shown, a plurality of remote computers 550 include graphics templates 515 and data store 516. Such remote data stores allow the trigger inserter 512 to define pointers to remote graphics templates and data sources in a trigger. Similarly, the messaging application 513 may specify remote graphics templates and metadata. The graphics inserter 514 may then reference these remote data sources to create graphics objects.

Figure 6:
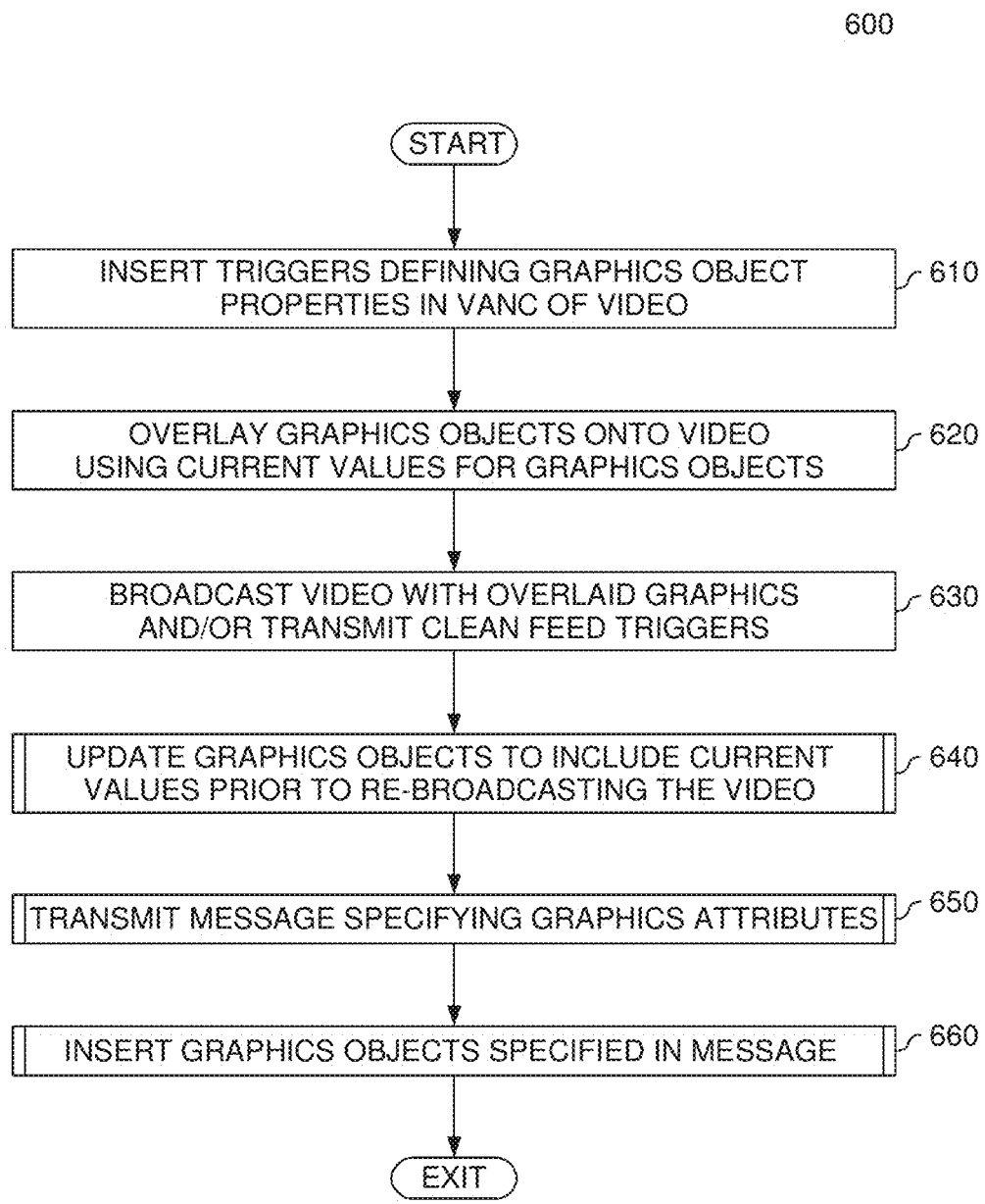
FIG. 6 is a flow chart illustrating a method to carry graphical data embedded in a program stream and provide directed delivery of data for on-air graphics, according to one embodiment.

FIG. 6 is a flow chart illustrating a method 600 to carry graphical data embedded in a program stream and provide directed delivery of data for on-air graphics, according to one embodiment. Although depicted as occurring in the same flow, one or both of carrying graphical data stream and providing directed delivery for data for on-air graphics may be performed in a given iteration of the method 600. Generally, carrying graphical data embedded in a program stream allows graphical content to be refreshed to include current values by specifying locations of the data values (and the graphics objects templates) in the data space of a video. Providing directed delivery of data for on-air graphics generally refers to remotely causing the insertion of graphics in a video.

At step 610, the graphics inserter 512 may insert triggers defining graphics object properties in the VANC of a video. The properties may include, without limitation, a pointer to a location of a template for the graphics object, a pointer to a current value for a variable (such as the current temperature) of the graphics object, and a time in the video to insert the graphics object, when created. At step 620, a graphics inserter 514 may identify the triggers in the video, and insert graphics objects onto the video using then-current values for the variables in the graphics objects. At step 630, a broadcasting entity may broadcast the video with overlaid graphics through one or more transmissions media, such as the Internet, cable, or satellites. Also at step 630, a clean feed of the video including the inserted graphics triggers may be stored (such as in the videos 517), or transmitted to one or more remote broadcasting entities for storage and later playback. At step 640, described in greater detail with reference to FIG. 7, the remote entities may process the video including the triggers to include then-current values for the variables in the graphics objects prior to re-broadcasting the video. For example, if the clean feed of the video including the triggers was produced a week earlier, but needs to be re-broadcast, the graphics inserter 514 may identify the triggers while processing the videos. The graphics inserter 514 may then obtain the graphics templates and the then-current variable values from the locations specified by the triggers. The graphics inserter 514 may then create the graphics objects, and overlay them on the video at the time specified by the trigger. Once the video is re-produced to include the updated graphics, the video may be re-broadcasted, re-transmitted, or stored for future use.

At step 650, described in greater detail with reference to FIG. 8, the messaging application 513 may transmit a message specifying promotional graphics attributes. The message may include, without limitation, a location of a graphics template and metadata (or a pointer thereto) to include in the graphics object. The metadata may comprise any information, such as program air dates and times. At step 660, described in greater detail with reference to FIG. 9, the message inserter 514 may insert a graphics object according to the message specifications in the video.

As previously indicated, not all steps of the method 600 may be executed in a given iteration. Generally, the graphics inserter 514 may insert graphics in a video based on a graphics trigger in the data space of the video, a received message specifying graphics attributes, or both. For example, while processing graphics triggers in the video, the graphics inserter 514 may further be directed to insert a graphic specified in a message generated by the messaging application 513. In other embodiments, the graphics inserter 514 may insert graphics based on received messages, and not based on triggers. In still other embodiments, the graphics inserter 514 may insert graphics defined by triggers in the data space of the video, and not based on any received messages.

Figure 7:
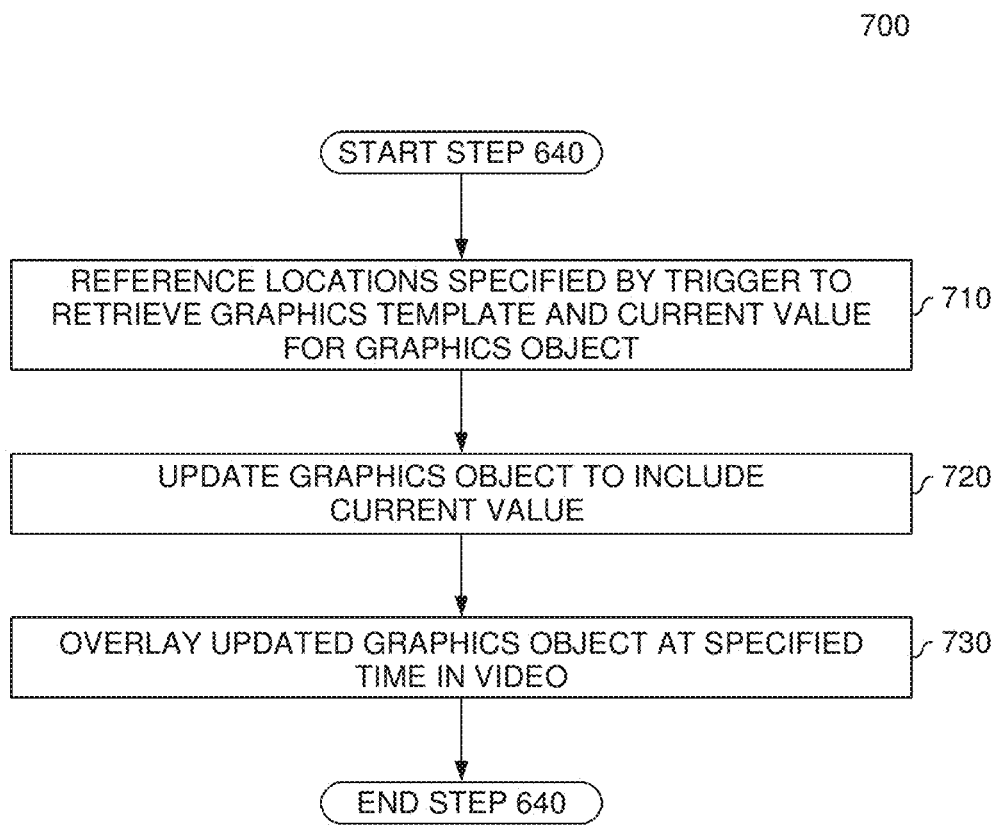
FIG. 7 is a flow chart illustrating a method to update graphics objects in a video to include current values, according to one embodiment.

FIG. 7 is a flow chart illustrating a method 700 corresponding to step 640 to update graphics objects in a video to include current values, according to one embodiment. In at least some embodiments, the graphics inserter 514 performs the steps of the method 700 in order to ensure that graphics overlaid on a video include current values. For example, the graphics may be stock tickers, weather related, display the date and/or time, sports scores, news crawls, and the like. At step 710, the graphics inserter 514 may reference locations specified by the trigger to retrieve a graphics template and a current value for a variable of the graphics object. For example, a first URL may specify a sports score graphics template in the graphics templates 515, while a second URL may specify an RSS feed in the data store 516 including updated sports scores. At step 720, the graphics inserter 514 may update the retrieved sports score graphics template to include the current sports score. At step 730, the graphics inserter 514 may overlay the updated graphics object on the video at the time specified by the trigger. The graphics inserter 514 may execute the steps of the method 700 for each graphics trigger identified in the data space of a given video.

Figure 8:
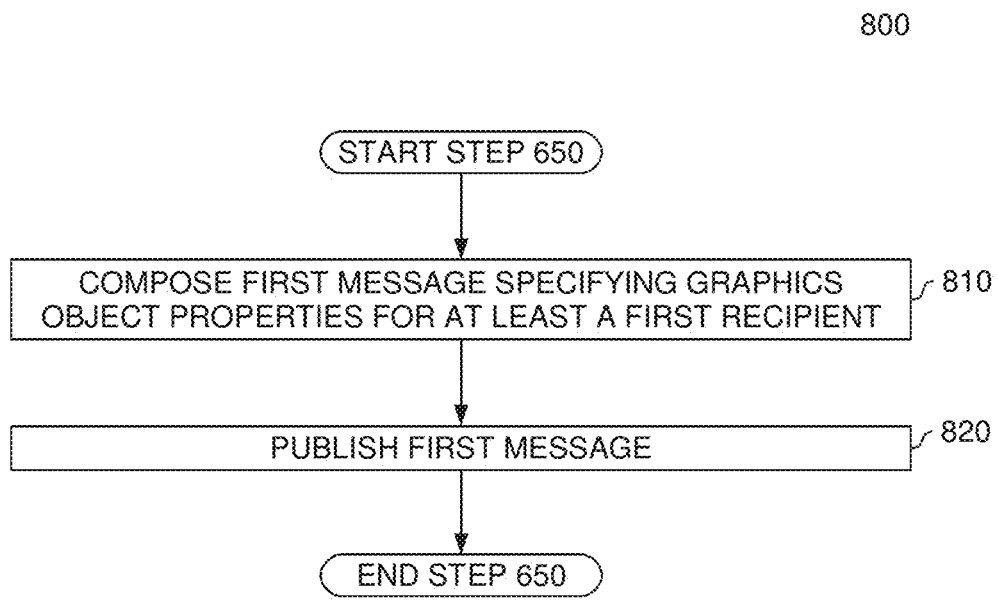
FIG. 8 is a flow chart illustrating a method to transmit a message specifying graphics properties, according to one embodiment.

FIG. 8 is a flow chart illustrating a method 800 corresponding to step 650 to transmit a message specifying graphics attributes, according to one embodiment. Generally, the messaging application 513 may execute the steps of the method 800 in order to remotely trigger the insertion of graphics objects in a video prior to broadcasting the video as part of a media program. Generally, the messaging application 513 may generate any number of messages intended for any number of recipients.

At step 810, the messaging application 513 may compose a first message specifying graphics object properties for at least a first recipient. The messages may generally include a graphics template identifier, metadata regarding a subject of the graphic (such as an event, program, product or other promotional item), and a time to insert the graphic in the video. In at least some embodiments, the message may also include an identifier, such as a region identifier, used to limit the scope of broadcasting entities adding the graphic to their video programs. The message may be, for example and without limitation, an email, social media message, SMS message, text message, MMS message, and the like. At step 820, the messaging application 513 may publish the first message through an appropriate communications medium.

Figure 9:
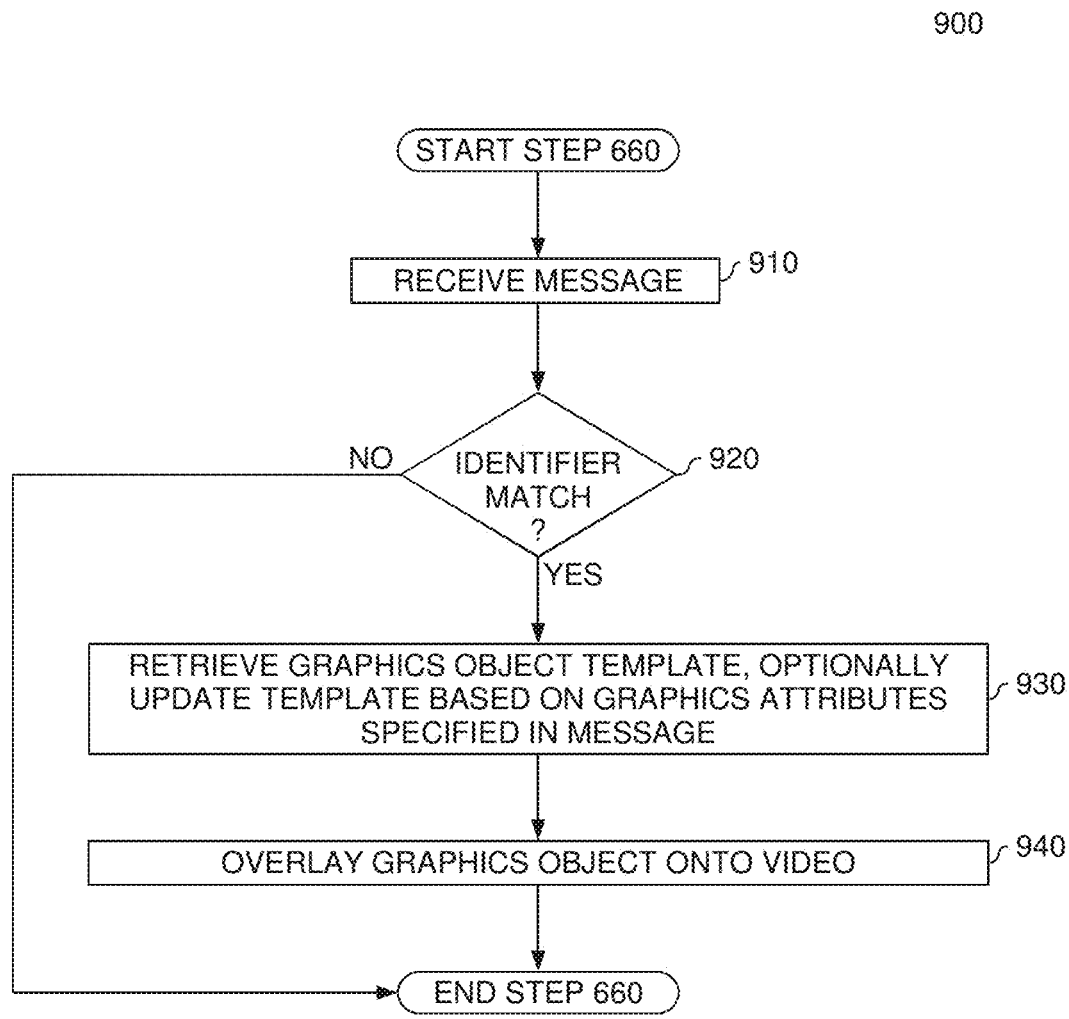
FIG. 9 is a flow chart illustrating a method to receive a message and optionally insert a graphics object specified in the message into a video, according to one embodiment.

FIG. 9 is a flow chart illustrating a method 900 corresponding to step 660 to insert a graphics object specified in a message into a video, according to one embodiment. Generally, the steps of the method 900 allow a recipient of a message transmitted by the messaging application 513 to create and insert a graphic into a video according to the parameters specified in the message. In some embodiments, the messaging application 513 and graphics inserter 514 perform the steps of the method 900 in tandem. In other embodiments, the graphics inserter 514 is configured to receive the messages sent by the messaging application 513 and perform the steps of the method 900. The steps of the method 900 will be discussed using the latter embodiments as a reference example.

At step 910, the graphics inserter 514 receives a message sent by the messaging application 513. At step 920, the graphics inserter 514 determines whether the identifier in the message matches the identifier of the broadcasting entity broadcasting the video. In at least one embodiment, the identifier is a region identifier corresponding to a distinct geographic region. If the identifiers do not match, the graphics inserter 514 discards the message, and may optionally wait for more messages to arrive. If the identifiers match, the graphics inserter 514 proceeds to step 930, where the graphics inserter 514 retrieves the graphics object at the location specified in the message. The graphics inserter 514 may also update the template based on the attributes specified in the message, to create a completed graphics object. At step 940, the graphics inserter 514 may overlay the graphics object onto the video at the time specified in the message. The time in the message may be an exact time, or a range of times in the video within which the graphics object should be overlaid. The graphics inserter 514 may execute the steps of the method 900 for each message received while processing a video. Once the video has been processed to include the message-driven graphics, the video may be broadcasted, transmitted, or stored for future use.

By inserting graphics triggers in the data space of a video, embodiments disclosed herein streamline workflows by reducing redundant graphics distribution. Doing so may remove a large part of a traditionally file-based workflow that may be inefficient or impractical. By storing, carrying, and distributing compact URLs in the triggers, the large, complex graphical images can be stored centrally in a cloud model, and referenced/recalled when the graphics data is reassembled from the program stream.

Similarly, by transmitting messages that remotely cause the insertion of graphics into a video stream, embodiments disclosed herein leverage different data distribution methods to accomplish graphics workflows that have traditionally been manual and time consuming endeavors in the past.

Reference has made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the trigger inserter 512 could execute on a computing system in the cloud and insert triggers in the data space of a video. In such a case, the trigger inserter 512 could insert the triggers in the video and store the video at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
receiving a first message by a first broadcasting entity of a plurality of broadcasting entities, the first message specifying attributes of a first graphics object to overlay on a video, wherein the attributes of the first graphics object comprise: (i) a network address of a template for the first graphics object, (ii) a time in the video to overlay the first graphics object, and (iii) a geographic region identifier for inserting the first graphics object;
determining that a geographic region identifier of the first broadcasting entity matches the geographic region identifier for inserting the first graphics object, wherein the geographic region identifier of the first broadcasting entity is related to a first geographic region, of a plurality of geographic regions, where an audience of the first broadcasting entity is located;
receiving a second message by the first broadcasting entity, the second message specifying attributes of a second graphics object to overlay on the video, the wherein the attributes comprise: (i) a network address of a template for the second graphics object, (ii) a time in the video to overlay the second graphics object, and (iii) a geographic region identifier for inserting the second graphics object;
determining that a geographic region identifier of the first broadcasting entity does not match the geographic region identifier for inserting the second graphics object;
refraining from overlaying the second graphics object on the video; and
broadcasting, by the first broadcasting entity, the video with the first graphics object and without the second graphics object to the audience in the first geographic region.

2. The method of claim 1, further comprising:
responsive to receiving the message by the first broadcasting entity:
retrieving the template for the first graphics object from the network address specified in the first message;
creating the first graphics object using the template; and
overlaying the graphics object on the video at the specified time in the video.

3. The method of claim 2, the method further comprising:
receiving the first message by a second broadcasting entity, different than the first broadcasting entity;
determining that the geographic region identifier of the first graphics object does not match a geographic region identifier of the second broadcasting entity, wherein the geographic region identifier of the second broadcasting entity is related to a second geographic region, of the plurality of geographic regions, where the audience of the second broadcasting entity is located;
refraining from overlaying the first graphics object on the video; and
broadcasting, by the second broadcasting entity, the video without the first graphics object to the audience in the second geographic region.

4. The method of claim 3, wherein the attributes of the first graphics object further comprise metadata related to the first graphics object, wherein the metadata is added to the graphics template to create the first graphics object.

5. The method of claim 1, wherein the first and second messages are received by the plurality of broadcasting entities by one or more of: (i) email, (ii) a social media platform, (iii) an SMS message, (iv) a web page, and (v) a network connection.

6. The method of claim 1, wherein the first broadcasting entity is configured to add the first graphics object to the video without being under the control of a control network.

7. The method of claim 1, wherein the first and second messages are further received by one or more of: (i) a digital signage station, (ii) a digital billboard, (iii) a digital kiosk, and (iv) a subscriber.

8. A computer program product, comprising:
a non-transitory computer-readable storage medium having computer-readable program code embodied there-with, the computer-readable program code executable by a processor to perform an operation comprising:

receiving a first message by a first broadcasting entity of a plurality of broadcasting entities, the first message specifying attributes of a first graphics object to overlay on a video, wherein the attributes of the first graphics object comprise: (i) a network address of a template for the first graphics object, (ii) a time in the video to overlay the first graphics object, and (iii) a geographic region identifier for inserting the first graphics object;

determining that a geographic region identifier of the first broadcasting entity matches the geographic region identifier for inserting the first graphics object, wherein the geographic region identifier of the first broadcasting entity is related to a first geographic region, of a plurality of geographic regions, where an audience of the first broadcasting entity is located;

receiving a second message by the first broadcasting entity, the second message specifying attributes of a second graphics object to overlay on the video, the wherein the attributes comprise: (i) a network address of a template for the second graphics object, (ii) a time in the video to overlay the second graphics object, and (iii) a geographic region identifier for inserting the second graphics object;

determining that a geographic region identifier of the first broadcasting entity does not match the geographic region identifier for inserting the second graphics object;

refraining from overlaying the second graphics object on the video; and broadcasting, by the first broadcasting entity, the video with the first graphics object and without the second graphics object to the audience in the first geographic region.

9. The computer program product of claim 8, the operation further comprising:

responsive to receiving the message by the first broadcasting entity:

retrieving the template for the first graphics object from the network address specified in the first message;

creating the first graphics object using the template; and overlaying the graphics object on the video at the specified time in the video.

10. The computer program product of claim 9, the operation further comprising:

receiving the first message by a second broadcasting entity, different than the first broadcasting entity;

determining that the geographic region identifier of the first graphics object does not match a geographic region identifier of the second broadcasting entity, wherein the geographic region identifier of the second broadcasting entity is related to a second geographic region, of the plurality of geographic regions, where the audience of the second broadcasting entity is located;

refraining from overlaying the first graphics object on the video; and broadcasting, by the second broadcasting entity, the video without the first graphics object to the audience in the second geographic region.

11. The computer program product of claim 10, wherein the attributes of the first graphics object further comprise metadata related to the first graphics object, wherein the metadata is added to the graphics template to create the first graphics object.

12. The computer program product of claim 8, wherein the first and second messages are received by the plurality of broadcasting entities by one or more of: (i) email, (ii) a social media platform, (iii) an SMS message, (iv) a web page, and (v) a network connection.

13. The computer program product of claim 8, wherein the first broadcasting entity is configured to add the first graphics object to the video without being under the control of a control network.

14. The computer program product of claim 8, wherein the first and second messages are further received by one or more of: (i) a digital signage station, (ii) a digital billboard, (iii) a digital kiosk, and (iv) a subscriber.

15. A system, comprising:

one or more computer processors; and a memory containing a program, which when executed by the one or more computer processors, performs an operation comprising:

receiving a first message by a first broadcasting entity of a plurality of broadcasting entities, the first message specifying attributes of a first graphics object to overlay on a video, wherein the attributes of the first graphics object comprise: (i) a network address of a template for the first graphics object, (ii) a time in the video to overlay the first graphics object, and (iii) a geographic region identifier for inserting the first graphics object;

determining that a geographic region identifier of the first broadcasting entity matches the geographic region identifier for inserting the first graphics object, wherein the geographic region identifier of the first broadcasting entity is related to a first geographic region, of a plurality of geographic regions, where an audience of the first broadcasting entity is located;

receiving a second message by the first broadcasting entity, the second message specifying attributes of a second graphics object to overlay on the video, the wherein the attributes comprise: (i) a network address of a template for the second graphics object, (ii) a time in the video to overlay the second graphics object, and (iii) a geographic region identifier for inserting the second graphics object;

determining that a geographic region identifier of the first broadcasting entity does not match the geographic region identifier for inserting the second graphics object;

refraining from overlaying the second graphics object on the video; and broadcasting, by the first broadcasting entity, the video with the first graphics object and without the second graphics object to the audience in the first geographic region.

16. The system of claim 15, the operation further comprising:

responsive to receiving the message by the first broadcasting entity:

retrieving the template for the first graphics object from the network address specified in the first message;

creating the first graphics object using the template; and overlaying the graphics object on the video at the specified time in the video.

17. The system of claim 16, the operation further comprising:

receiving the first message by a second broadcasting entity, different than the first broadcasting entity;

determining that the geographic region identifier of the first graphics object does not match a geographic region identifier of the second broadcasting entity, wherein the geographic region identifier of the second broadcasting entity is related to a second geographic region, of the plurality of geographic regions, where the audience of the second broadcasting entity is located;

refraining from overlaying the first graphics object on the video; and broadcasting, by the second broadcasting entity, the video without the first graphics object to the audience in the second geographic region.

18. The system of claim 17, wherein the attributes of the first graphics object further comprise metadata related to the first graphics object, wherein the metadata is added to the graphics template to create the first graphics object.

19. The system of claim 15, wherein the first and second messages are received by the plurality of broadcasting entities by one or more of: (i) email, (ii) a social media platform, (iii) an SMS message, (iv) a web page, and (v) a network connection.

20. The system of claim 15, wherein the first broadcasting entity is configured to add the first graphics object to the video without being under the control of a control network, wherein the first and second messages are further received by one or more of: (i) a digital signage station, (ii) a digital billboard, (iii) a digital kiosk, and (iv) a subscriber.

* * * * *